April 20, 1943.   E. RIEMENSCHNEIDER   2,317,221
WELDING APPARATUS
Filed Dec. 18, 1940
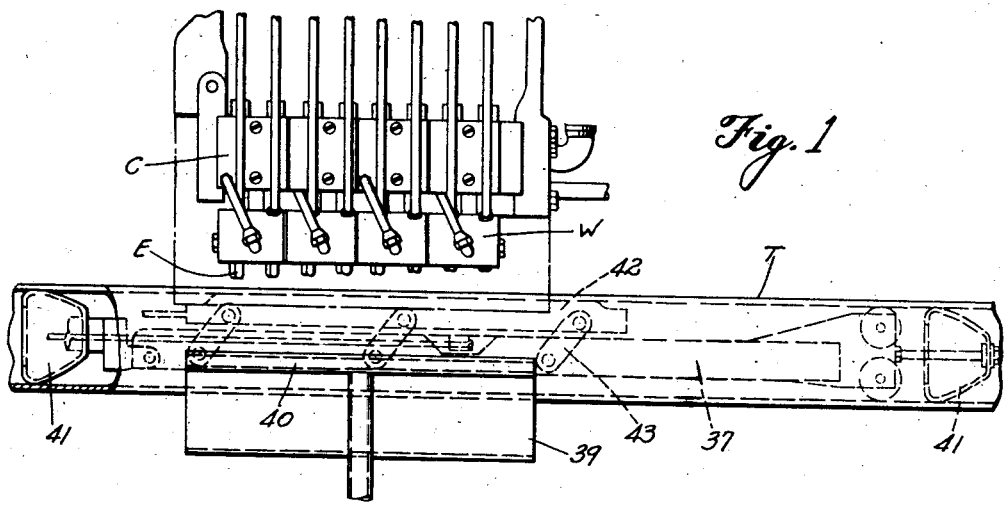
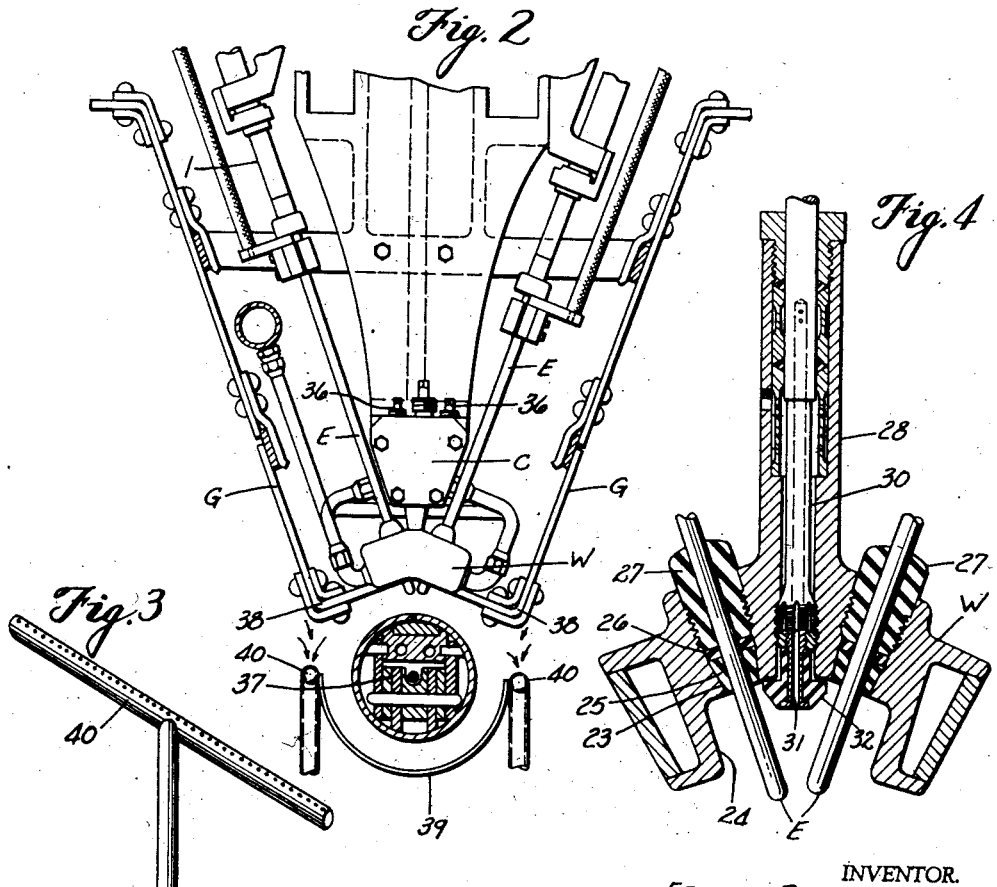
INVENTOR.
ERNEST RIEMENSCHNEIDER
BY
Louis W. Helmuth Patented Apr. 20, 1943

2,317,221

UNITED STATES PATENT OFFICE 2,317,221

WELDING APPARATUS

Ernest Riemenschneider, Jackson, Mich., assignor to The Midland Steel Products Company, Cleveland, Ohio, a corporation of Ohio Application December 18, 1940, Serial No. 370,612

10 Claims. (Cl. 219—6)

This invention relates to new and useful improvements in welding apparatus and is a continuation in part of my copending application for welding apparatus, Serial No. 242,537, filed November 26, 1938 (now Patent No. 2,240,627, dated May 6, 1941).

An important object of the invention is to provide means for eliminating adverse drafts and currents of air in the welding zone and to generally improve the construction shown in my prior Patent No. 2,061,671, granted November 24, 1936.

Another object of the invention is to provide for greater arc stability in the insulation of the electrodes from the welding heads and electrode feed as well as to prevent arcing between the electrods and the gas feeding nozzles.

Other objects and advantages of the invention will become apparent during the course of the following description.

In the accompanying drawing forming a part of the application and wherein like numerals are employed to designate like parts throughout the several views:

Fig. 1 is a fragmentary side elevation of the welding head in position to weld tubing, Fig. 2 is a fragmentary end elevation of the same showing the tubing and mandrel for supporting the same, Fig. 3 is a perspective view of the means for producing an air curtain, Fig. 4 is an enlarged vertical section through a partition of the welding head.

To improve the maintenance and efficiency of the apparatus disclosed in my former United States Letters Patent No. 2,061,671, to which reference may be had for more specific details of construction and operation of certain portions of the apparatus, means have been provided looking primarily toward greater stabilization of the welding arcs throughout long periods of operation. To obtain a uniformly, sound, continuous weld in the tubing T or other parts being welded, it is necessary to maintain stability of the arc created between each pair of electrodes E. As explained in the aforesaid patent, the arc voltage regulates the spacing of the arcing ends of each pair of electrodes E through appropriate controls and electrode feed mechanism including an electrode holder sleeve I automatically moved up or down during the welding operation to maintain a constant steady arc between the lower converging ends of each pair of tungsten electrodes E. The lower ends of these electrodes are disposed within a cavity 24 in a welding head W which is disposed in close proximity to the tubing T and is co-extensive with the width of the tubing and the length of the welding zone. As best seen in Fig. 4, this welding head is provided with a pair of inwardly converging internally threaded openings terminating at their inner ends in tapered portions 23 where they enter the cavity 24 of the welding head. Tapered insulated packings 25 are forced to seat in air tight fashion upon the tapered portions of the opening by means of Ill-slur or hard insulating material washers 26 forced down upon the packing by screws 27 of insulating material, screwed into the threaded portions of said openings. The tungsten electrodes E have a sliding fit through said screws, washers and packings and project into the cavity 24 in downwardly converging relationship.

Hydrogen gas is fed into the center of the cavity 24 and around the electrodes through a nozzle 28, as set forth in my aforesaid patent. A distributor tube 30 having a longitudinal central gas passage extends through the nozzle 28. This tube at its intermediate portion is of smaller diameter than the opening in the nozzle through which it extends, so as to provide a gas passage therebetween. The lower end of this tube is enlarged and externally threaded to screw into the nozzle and is provided with longitudinal slots through the thread to permit the gas to pass between the tube and nozzle out into the central portion of cavity 24 between the two electrodes. The lower end of the gas tube is provided with interior threads to receive the upper threaded end of a flanged ferrule 31, extending axially through the enlarged head and shank of a jet 32 of insulating material. This enlarged head of the jet is substantially a truncated cone section and its integral tubular shape is forced against the lower end of the tube 30 by the flange when the metallic ferrule 31 is screwed into the end of the tube. Gas flows axially through the jet and is directed between the arcing ends of the electrode E, while at the same time gas is caused to flow through the nozzle 28 to enter the cavity 24 between the walls thereof and the enlarged head of the jet to distribute a uniform quantity of gas around each electrode. The quantity of gas passing through and around the gas tube 30 is regulated by needle valves 36 in a distributing chamber C into which the nozzle 28 extends.

The tubing T to be welded by the apparatus is fed over a mandrel 37 located beneath the welding head well up between the somewhat inverted V-shaped bottom walls 38 of a heat shield G enclosing the mechanism to form a cloak over the welding zone. Beneath the tubing and the welding zone is positioned an arcuate shield 39 which is substantially co-extensive with the heat shield G. Both of these shields are co-extensive with the welding zone and substantially surround that portion of the tubing being welded. In order to exclude drafts of air as much as possible from the inside of the tubing being welded, outwardly opening cup-shaped baffles 41 of thin resilient metal are secured to opposite ends of the mandrel to lightly circumferentially engage the inner walls of the tubing as it passes thereover. A shoe 42 supported upon links 43 of the mandrel, is urged by spring action, as disclosed in my former patent, to engage the underside of the same being welded and serves as a safety factor in case the molten metal of the seam has any tendency to drop into the tubing. However, due to the control of the edges of the seam being welded, by means disclosed in my formed United States Letters Patent No. 1,948,801 the metal is held in the seam so that the shoe structure 42 simply serves in the capacity of assisting in the exclusion of drafts of air up through the seam being welded.

It will be noted that there are horizontal open spaces left between the shields 39 and G so that the operator may look therebetween and observe the performance of the arcs over the seam being welded, and it is through these open spaces at the sides and end of the welding zone through which adverse drafts of air may enter the welding zone to interfere with the uniform and constant performance of the arcs. In order to preclude the admission of such adverse drafts to the welding zone, it is proposed to create strata, bands, curtains, or layers of moving air enclosing or surrounding the welding zone to create a potential force in the form of a barrier wall spaced from the electrodes precluding the entrance of drafts or extraneous air into the welding zone, while still maintaining visibility through the spaces between the two shields and without interfering with the body of reducing gas fed around the electrodes. Therefore, on opposite side edges, and if desired, at opposite ends of the arcuate shield 39, are placed horizontal tubes or manifolds 40 which are perforated or slotted longitudinally to either suck in air or to discharge air under pressure for creating curtains or walls of moving air between the two shields. The force or velocity of these curtains of air would preclude drafts of lesser velocity entering the welding zone between the shields. If desired, the lower shield 39 could be dispensed with by arranging the pipes 40 against the sides of the tubing T or shield 38 so as to draw or force curtains of air between or tangentially against the opposite sides of the tubing and the upper shield or guide G.

With hydrogen flowing through the nozzle 30 and above the electrodes, the entire welding zone contains a quantity of burning hydrogen and is thus substantially isolated from surrounding atmosphere and is, to some extent, protected against drafts which might otherwise disturb the stability of the arcs during welding and even penetrate the welding zone to oxidize the weld. However, with the curtains of air, this burning hydrogen is confined around and in the welding zone to effectively exclude oxygen and drafts of air. It has been found that drawing air into the tube 40 by means of connecting them with a source of suction, produces the most satisfactory results in creating the curtains of air and stabilizing the arc by excluding drafts and atmosphere from their vicinity. The arrows in Fig. 2 show the curtains or enclosing walls of air at the sides of the tubing, which curtains are drawn between the bottom of the shield G and the sides of the shield 39.

It is to be understood that various changes in the shape and arrangement of parts may be resorted to without departing from the spirit of the invention or the scope of the appended claims, and that where tubing is referred to as the article to be welded, any article or product having a seam to be welded, is to be construed as being covered by the terminology. The term torch is also to be given its broadest scope.

I claim:

1. In apparatus for welding tubing, means for feeding tubing lengthwise thereof; an elongated welding head extending lengthwise of the tubing for a considerable distance and forming an enclosure spaced above the same to exclude air and to provide a welding zone and means at opposite sides of the head for directing continuous vertical walls of moving air at and coextensive with opposite sides of the tubing between the same and the head to confine and exclude atmosphere from the welding zone and whereby the welding zone can be viewed through said walls of air.

2. In apparatus for welding tubing, means for feeding tubing lengthwise thereof, an elongated welding head extending lengthwise above the tubing for a substantial distance to provide a welding zone and to form a shield above the same for preventing the entrance of atmospheric air to the welding zone therebeneath, the tubing constituting a lower shield for the welding zone to exclude atmosphere, and means at opposite sides of the welding head coextensive therewith for creating vertical spaced continuous solid sheets of moving air at and coextensive with opposite sides of the tubing and extending from the welding head to the sides of the tubing tangentially to form a transparent enclosure for the welding zone within which atmosphere is excluded.

3. In apparatus for welding tubing, means for feeding tubing lengthwise thereof, an elongated welding head extending lengthwise above the tubing for a substantial distance and forming a welding zone and a top shield for the welding zone, a second shield beneath the tubing forming a bottom closure under the tubing and being spaced from said top shield, and means disposed at opposite sides of the tubing for directing a pair of substantially parallel perpendicular continuous curtains of air from one shield to the other to cooperate therewith in forming an enclosure to exclude atmosphere from the welding zone.

4. In tube welding apparatus, a welding torch, means for feeding tubing to be welded beneath said torch in close proximity thereto, a shield covering said tubing and being co-extensive with the welding zone, a second shield beneath said tubing spaced from said first shield and co-extensive with the welding zone providing sight openings between the shields, and means for producing strata of moving air between the two shields and spaced from said torch.

5. In tube welding apparatus, a welding torch, means for feeding tubing to be welded beneath said torch in close proximity thereto, a shield covering said tubing and being co-extensive with the welding zone and spaced from the tubing to provide sight openings, and suction means adjacent opposite sides of the tubing for drawing strata of moving air from opposite sides of the shield and across said sight openings in spaced relation to said torch.

6. In tube welding apparatus, a welding torch, means for feeding tubing to be welded beneath said torch in close proximity thereto, a shield covering said tubing and being co-extensive with the welding zone, a second shield beneath said tubing spaced from said first shield and co-extensive with the welding zone producing sight openings between said shields, and suction pipes associated with opposite sides of one of said shields for creating strata of moving air from one shield to the other and across said sight openings.

7. In tube welding apparatus, a welding torch, means for feeding tubing to be welded beneath said torch, said torch forming an air excluding shield and including means for feeding a reducing gas upon and around the torch and the seam to be welded, and means for creating strata of moving air beyond and spaced from said torch to produce curtains between the torch and tubing surrounding the welding zone to confine the reducing gas of the torch to the welding zone and to exclude air from said zone.

8. In apparatus for welding tubing, means for feeding tubing lengthwise of the apparatus to receive the longitudinally welded seam, an elongated solid welding head arranged over the tubing and spaced a distance above the same to form a welding zone in the space between the head and tubing and a space through which the welding progress can be observed, and means at opposite sides of the tubing for creating solid continuous vertical draft impregnable curtains or strata of air coextensive with the welding zone and constantly moving between the welding head and tangentially to the tubing to form with the head a complete enclosure for the welding zone.

9. In tubing welding apparatus, a welding torch employing welding gas for producing a welding flame, means for feeding tubing to be welded to said torch in close proximity thereto, baffles within the tubing at opposite ends of the welding zone, a shield beneath and co-extensive with the tubing and the welding zone to partially enclose part of the tubing being welded, said torch being substantially co-extensive with the width of the tubing and the length of the welding zone to exclude air from the top of the tubing, and means for establishing continuously moving curtains of air between the sides of the torch and tubing to confine the welding gas therebetween and to prevent drafts from interfering with the welding flame.

10. In apparatus for welding tubing, means for feeding tubing lengthwise of the apparatus, an elongated welding head arranged over the tubing and extending lengthwise thereof to form a welding zone and to assist in excluding atmosphere therefrom, and means for establishing continuous curtains of air extending tangentially from opposite sides of the tubing substantially vertically and substantially parallel with each other to opposite sides of the welding head and coextensive therewith to form with the tubing and head an air excluding enclosure for the welding zone.

ERNEST RIEMENSCHNEIDER.